(12) United States Patent
Eun et al.

(10) Patent No.: US 8,350,888 B2
(45) Date of Patent: Jan. 8, 2013

(54) APPARATUS AND METHOD FOR PROVIDING EMOTION EXPRESSION SERVICE IN MOBILE COMMUNICATION TERMINAL

(75) Inventors: Jung-Hwi Eun, Seoul (KR); Hee-Won Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 642 days.

(21) Appl. No.: 12/569,623

(22) Filed: Sep. 29, 2009

(65) Prior Publication Data

US 2010/0085414 A1  Apr. 8, 2010

(30) Foreign Application Priority Data

Oct. 8, 2008  (KR) .................. 10-2008-0098534

(51) Int. Cl.
*H04N 7/14* (2006.01)
(52) U.S. Cl. ............... 348/14.02; 348/14.01; 348/14.08
(58) Field of Classification Search .... 348/14.01–14.16; 382/118, 167, 274; 715/758
See application file for complete search history.

(56) References Cited

U.S. PATENT DOCUMENTS

| | | | |
|---|---|---|---|
| 2005/0231473 A1* | 10/2005 | Kim et al. | 345/157 |
| 2006/0251299 A1* | 11/2006 | Kinjo | 382/118 |
| 2007/0033534 A1* | 2/2007 | Kim et al. | 715/758 |
| 2008/0101660 A1 | 5/2008 | Seo | |
| 2008/0152111 A1 | 6/2008 | Mock et al. | |
| 2008/0158334 A1* | 7/2008 | Reponen et al. | 348/14.02 |
| 2008/0182566 A1 | 7/2008 | Camp, Jr. | |
| 2008/0284858 A1* | 11/2008 | Sasaki et al. | 348/208.1 |

FOREIGN PATENT DOCUMENTS

| | | |
|---|---|---|
| DE | 100 38 271 A1 | 2/2002 |
| EP | 1 509 042 A1 | 2/2005 |
| WO | 02/054738 A1 | 7/2002 |

OTHER PUBLICATIONS

Kwarada Y, Emoticon input device for mobile camera phone machine has CPU that extracts face image data from photograph of person's face and stores face image data in read-only memory, XP-002526873, Aug. 9, 2007.

* cited by examiner

*Primary Examiner* — Melur Ramakrishnaiah
(74) *Attorney, Agent, or Firm* — Jefferson IP Law, LLP

(57) ABSTRACT

A method and an apparatus for providing an emotion expression service in a mobile communication terminal are provided. The method includes identifying, by the mobile communication terminal performing a video call with a calling terminal, information of emotion expression in images received from the calling terminal, and generating, by the mobile communication terminal, an event corresponding to the identified information of emotion expression.

20 Claims, 4 Drawing Sheets

APPARATUS AND METHOD FOR PROVIDING EMOTION EXPRESSION SERVICE IN MOBILE COMMUNICATION TERMINAL

PRIORITY

This application claims the benefit under 35 U.S.C. §119 (a) of a Korean patent application filed in the Korean Intellectual Property Office on Oct. 8, 2008 and assigned Serial No. 10-2008-0098534, the entire disclosure of which is hereby incorporated by reference.

BACKGROUND OF THE INVENTION

1. Field of the Invention

The present invention relates to a mobile communication terminal. More particularly, the present invention relates to an apparatus and method for providing an emotion expression service in a mobile communication terminal.

2. Description of the Related Art

Mobile communication terminals provide not only a voice communication service but also a data communication service corresponding to the evolution of wireless communication technologies. For example, a mobile communication terminal may provide not only a voice call service, but also an internet service and a video call service.

The video call service transmits not only the voice of the calling party but also the image of the calling party to another mobile communication terminal.

As aforementioned, a mobile communication terminal may provide a communication service using an image. Furthermore, mobile communication service users are requesting more efficient and life-like communication services corresponding to the evolution of wireless communication technology.

Thus, there is a need to provide an apparatus and a method in a mobile communication terminal to transmit an emotion of the user of the calling terminal to the called terminal in addition to an image of the user of the calling terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for providing an emotion expression service in a mobile communication terminal.

Another aspect of the present invention is to provide an apparatus and method for providing an emotion expression service during a video call in a mobile communication terminal.

Still another aspect of the present invention is to provide an apparatus and method for providing an emotion expression service depending on a sentence or a word included a message in a mobile communication terminal.

In accordance with an aspect of the present invention, a method for providing an emotion expression service in a mobile communication terminal is provided. The method includes identifying, by the mobile communication terminal performing a video call service with a calling terminal, information of emotion expression in images received from the calling terminal, and generating, by the mobile communication terminal, an event corresponding to the identified information of emotion expression.

In accordance with another aspect of the present invention, a method for providing an emotion expression service in a mobile communication terminal is provided. The method includes generating, by the mobile communication terminal performing a video call with a called terminal, information of emotion expression for transmitting to the called terminal, and transmitting, by the mobile communication terminal, event request information corresponding to the information of emotion expression.

In accordance with another aspect of the present invention, an apparatus for providing an emotion expression service in a mobile communication terminal is provided. The apparatus includes a control unit for identifying information of emotion expression in images received from a calling terminal using a video call service, and for generating an event corresponding to the identified information of emotion expression.

In accordance with yet another aspect of the present invention, an apparatus for providing an emotion expression service in a mobile communication terminal is provided. The apparatus includes a camera unit for generating information of emotion expression for transmitting to a called terminal using a video call service, and a communication module for transmitting event request information corresponding to the information of emotion expression.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary apparatus and a method for providing an emotion expression service in a mobile communication terminal will be described. Herein, the emotion expression service denotes a service for expressing the emotion of a user of a calling terminal (i.e. a calling party, hereinafter a user of a calling terminal is referred to as "a calling party") using a video call service.

In an exemplary embodiment, the mobile communication terminal using a video call service recognizes shaking of the calling terminal or an expression on a display unit and provides an emotion expression event for expressing the emotion of the calling party. Herein, the emotion expression event may include vibration of the mobile communication terminal, a sound effect generated by the mobile communication terminal, and a screen effect generated by the mobile communication terminal.

Figure 1:
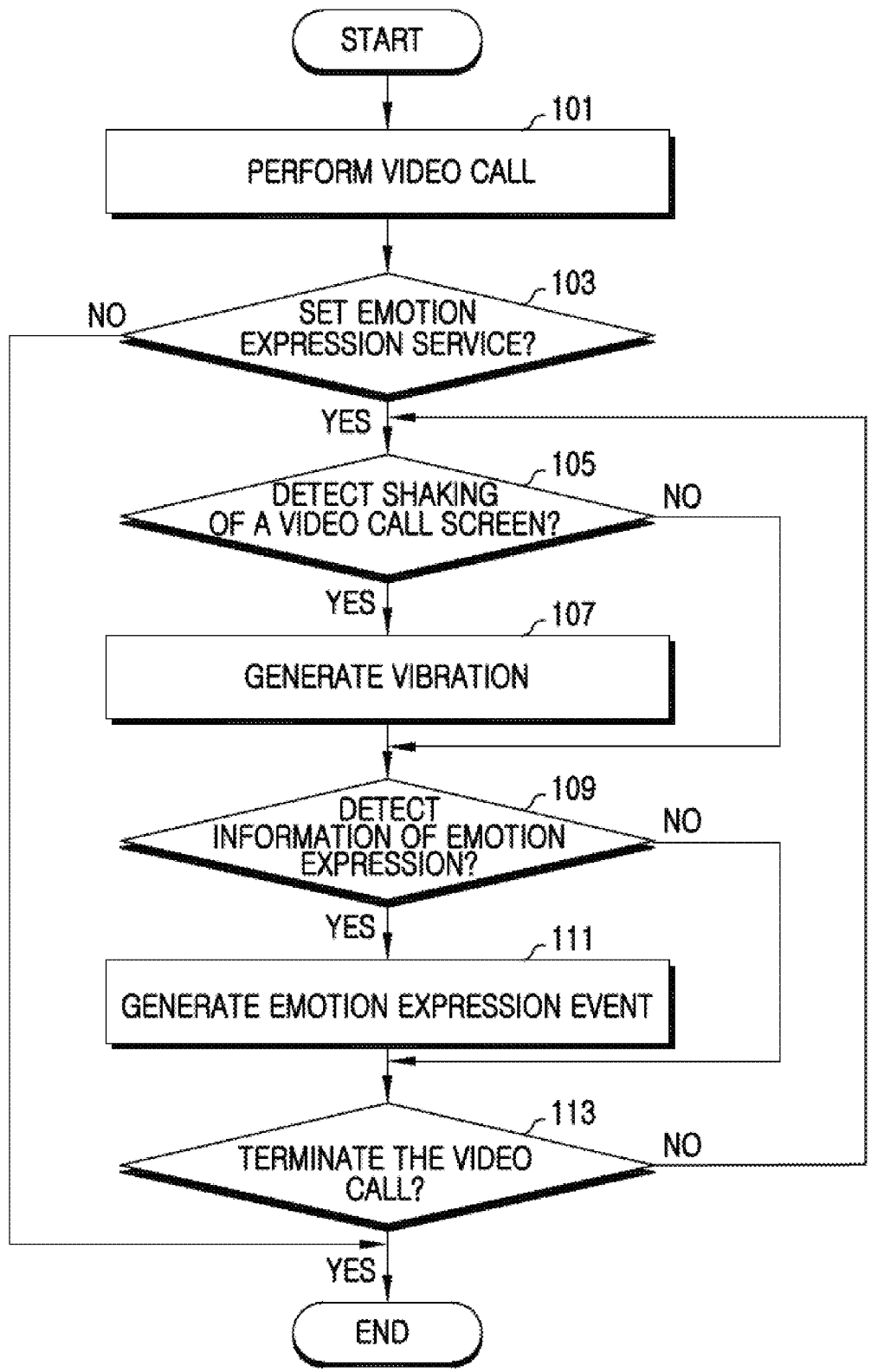
FIG. 1 is a flowchart illustrating a procedure for providing an emotion expression service in a mobile communication terminal according to an exemplary embodiment of the present invention.

In an exemplary embodiment, the mobile communication terminal performs a method for recognizing shaking by the user of the calling terminal or an expression on a display unit and provides an emotion expression service as illustrated in FIG. 1.

FIG. 1 is a flowchart illustrating a procedure for providing an emotion expression service in a mobile communication terminal according to an exemplary embodiment of the present invention.

Referring to FIG. 1, the mobile communication terminal performs a video call with the calling terminal in step 101.

In step 103, the mobile communication terminal determines whether the emotion expression service is set by a user.

If it is determined that the emotion expression service is not set, the mobile communication terminal ends the process according to the present invention. Here, the mobile communication terminal provides a general video call service.

On the other hand, if it is determined that the emotion expression service is set, the mobile communication terminal determines whether shaking of an image on a video call screen is detected in step 105. For example, the mobile communication terminal determines whether the differences among frames, i.e., differences among pixel values of frames that configure the video call screen, is greater than a reference value. Here, the mobile communication terminal may determine an average of differences among frames within a time interval and determine whether the image on the video call screen shakes.

When the average of differences among frames is less than the reference value, the mobile communication terminal determines that the image on the video call screen is not shaking. Therefore, in the 109, the mobile communication terminal determines whether information of emotion expression is detected in images of the video call screen. For example, the mobile communication terminal may recognize a facial expression of a calling party in received images from the calling terminal and determine whether the information of emotion expression corresponds to an emotion such as a smile expression, an angry expression and the like.

Otherwise, if it is determined in step 105 that the average of differences among frames is greater than or equal to the reference value, the mobile communication terminal determines that the image on the video call screen is shaking. Therefore, in step 107, the mobile communication terminal generates an event corresponding to the shaking image. For example, the mobile communication terminal generates a vibration. In an exemplary implementation, the mobile communication terminal determines a vibration strength corresponding to the amount, duration or strength of the shaking and generates a corresponding vibration. The amount, duration or strength of the shaking is determined by the differences among frames.

In step 109, the mobile communication terminal determines whether information of emotion expression is detected in images of the video call screen. For example, the mobile communication terminal may recognize a facial expression of the calling party in the video call screen and determine whether the information of emotion expression corresponds to a recognized expression such as a smile expression, an angry expression, and the like.

If it is determined that information of emotion expression is not detected, the mobile communication terminal determines whether the video call terminates in step 113.

Otherwise, if it is determined that information of emotion expression is detected in step 109, in step 111, the mobile communication terminal generates an emotion expression event corresponding to the information of emotion expression detected in step 109. For example, if the smile expression of the calling party is detected, the mobile communication terminal may generate the sound of laughter. As another example, if the smile expression of the calling party is detected, the mobile communication terminal may display a screen effect such as a smile expression or generate a vibration.

Then, the mobile communication terminal determines whether the video call terminates in step 113.

If it is determined that the video call is not terminated, the mobile communication terminal returns to step 105 and performs the described processes.

Otherwise, if it is determined that the video call is terminated, the mobile communication terminal ends the process according to the present invention.

As described in the above exemplary embodiments, the mobile communication terminal generates an emotion expression event, when the information of shaking or emotion expression is detected in images on the display unit.

In another exemplary embodiment, the mobile communication terminal generates an emotion expression event corresponding to the received information of emotion expression from the calling terminal.

Figure 2:
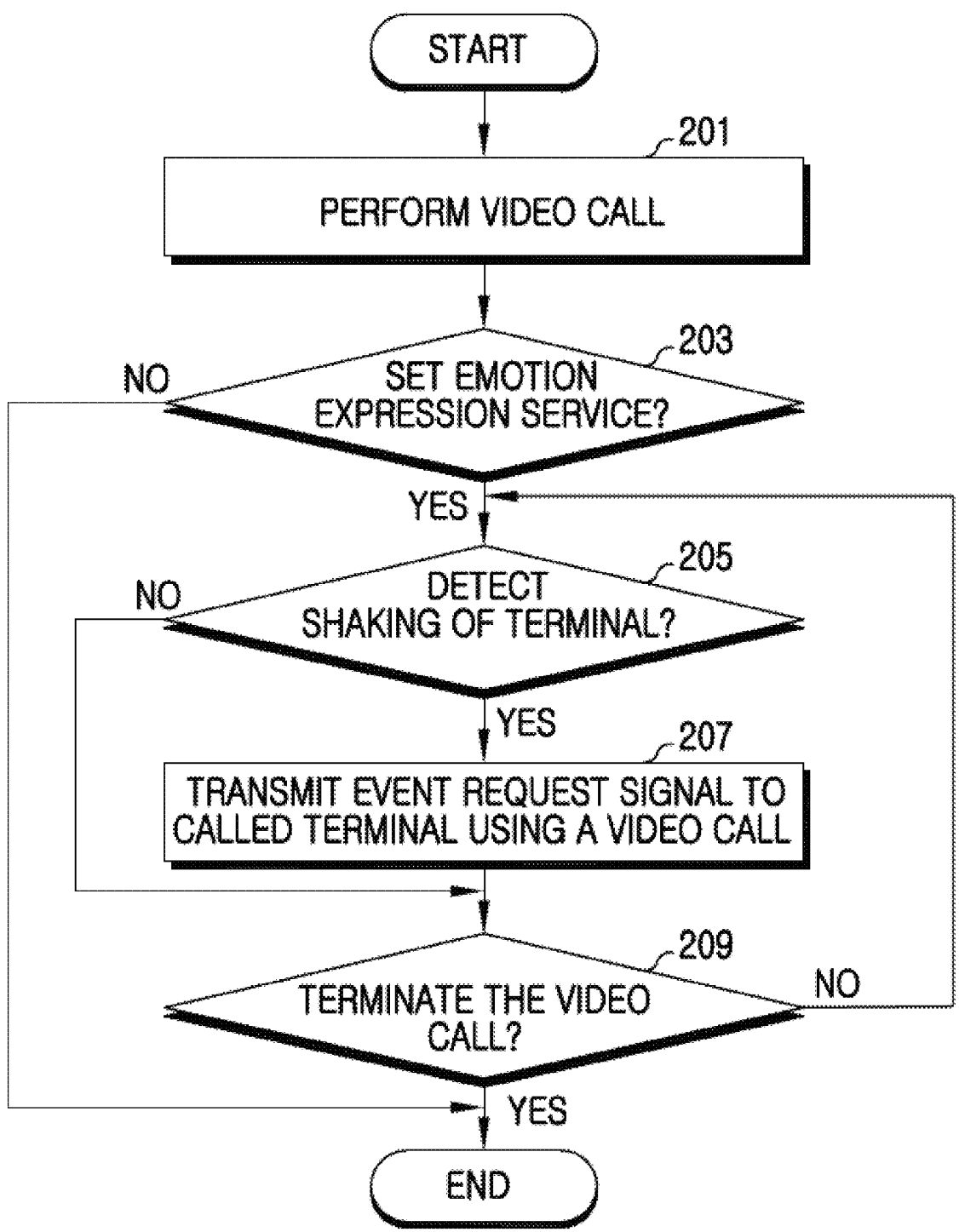
FIG. 2 is a flowchart illustrating a procedure for providing information of emotion expression to a calling terminal in a mobile communication terminal according to an exemplary embodiment of the present invention.

FIG. 2 is a flowchart illustrating a procedure for providing information of emotion expression to a called terminal in a mobile communication terminal according to an exemplary embodiment of the present invention.

Referring to FIG. 2, the mobile communication terminal performs a video call with a called terminal in step 201.

In step 203, the mobile communication terminal determines whether the emotion expression service is set by a user.

If it is determined that the emotion expression service is not set, the mobile communication terminal ends the process according to the present invention. Here, the mobile communication terminal provides a general video call service.

On the other hand, if it is determined in step 203 that the emotion expression service is set, the mobile communication terminal determines whether shaking of the mobile communication terminal is detected in step 205. For example, the mobile communication terminal may detect shaking of the mobile communication terminal using a Geo Magnetic Sensor. As another example, the mobile communication terminal determines whether a vibration generation button is input by the user.

If it is determined that shaking of mobile communication is not detected in step 205, the mobile communication terminal determines whether the video call terminates in step 209.

Otherwise, if it is determined that shaking of mobile communication is detected in step 205, the mobile communication terminal transmits an event request signal to the called terminal using the video call service in step 207. For example, the mobile communication terminal adds the event request information to the video call signal and transmits the video call signal to the called terminal. As another example, the mobile communication terminal may transmit the event request information using an extra control signal. Herein, the mobile communication terminal transmits the event request information using a control signal according to the H.324 protocol to the called terminal. Also, the mobile communication terminal may transmit the event request information through a control signal using an Internet Protocol (IP) of a Packet Switched Network.

After that, the mobile communication terminal determines whether the video call terminates in step 209.

If it is determined that the video call is not terminated, the mobile communication terminal returns to step 205 and performs the described processes.

Otherwise, if it is determined that the video call is terminated, the mobile communication terminal ends the process according to the present invention.

As described in the above exemplary embodiments, when the shaking of the mobile communication terminal is detected, the mobile communication terminal transmits the event request information.

In another exemplary embodiment, when information of emotion expression is detected in images for transmission to the called terminal, the mobile communication terminal transmits the event request signal corresponding to the information of emotion expression to the called terminal. For example, the mobile communication terminal may include a camera module for capturing images of the user to be transmitted to the called terminal. If information of emotion expression is detected in images captured by the camera module and to be transmitted to the called terminal, the mobile communication terminal may transmit an event request signal corresponding to the detected information of emotion expression.

Figure 3:
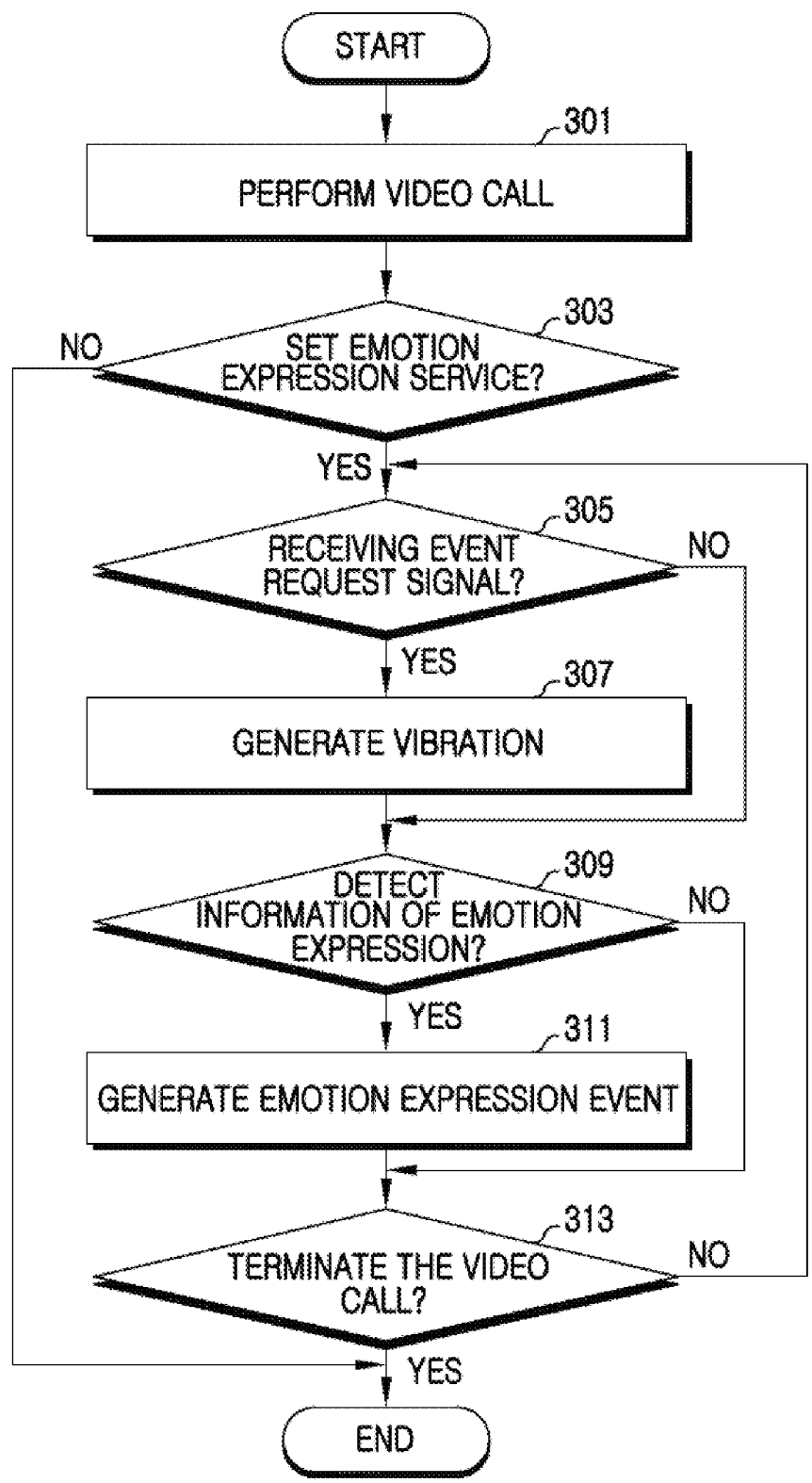
FIG. 3 is a flowchart illustrating a procedure for providing an emotion expression service in a mobile communication terminal according to another exemplary embodiment of the present invention; and, FIG. 4 is a block diagram illustrating a mobile communication terminal according to an exemplary embodiment of the present invention.

As described above, if the mobile communication terminal transmits the event request signal to the called terminal, the called terminal generates the emotion expression event corresponding to the event request signal as illustrated in FIG. 3.

FIG. 3 is a flowchart illustrating a procedure for providing an emotion expression service in a mobile communication terminal according to an exemplary embodiment of the present invention.

Referring to FIG. 3, the mobile communication terminal performs a video call with a calling terminal in step 301.

In step 303, the mobile communication terminal determines whether the emotion expression service is set by a user.

If it is determined that the emotion expression service is not set, the mobile communication terminal ends the process according to the present invention. Here, the mobile communication terminal provides a general video call service.

Otherwise, if it is determined in step 303 that the emotion expression service is set, the mobile communication terminal determines whether the event request signal is received from the calling terminal using a video call service in step 305.

If it is determined in step 305 that the event request signal is not received, the mobile communication terminal determines whether information of emotion expression is detected in images of a video call screen in step 309. For example, the mobile communication terminal may recognize a facial expression of a calling party in the video call screen and determine whether the information of emotion expression corresponds to an emotion such as a smile expression, an angry expression, and the like.

Otherwise, if it is determined in step 305 that the event request signal is received, the mobile communication terminal generates a shaking event in step 307 corresponding to the event request signal. For example, the mobile communication terminal generates a vibration. In an exemplary implementation, the mobile communication terminal determines a vibration strength corresponding to the amount, duration or strength of the event request signal and generates a corresponding vibration.

Then, the mobile communication terminal determines whether information of emotion expression is detected in images of the video call screen in step 309. For example, the mobile communication terminal may recognize a facial expression of the calling party in the video call screen and determine whether the information of emotion expression corresponds to an emotion such as a smile expression, an angry expression, and the like.

If it is determined that information of emotion expression is not detected in step 309, the mobile communication terminal determines whether the video call terminates in step 313.

Otherwise, if it is determined that information of emotion expression is detected in step 309, the mobile communication terminal generates an emotion expression event in step 311 corresponding to the information of emotion expression detected in step 309. For example, if the smile expression of the calling party is detected, the mobile communication terminal may generate the sound of laughter. As another example, if the smile expression of the calling party is detected, the mobile communication terminal may display a screen effect such as a smile expression or generate a vibration.

Then, the mobile communication terminal determines whether the video call terminates in step 313.

If it is determined that the video call is not terminated, the mobile communication terminal returns to step 305 and performs the described processes.

Otherwise, if it is determined that the video call is terminated, the mobile communication terminal ends the process according to the present invention.

In other words, an exemplary method for providing an emotion expression service in a mobile communication terminal comprises identifying, by the mobile communication terminal, information of emotion expression in received images from a calling terminal using a video call service, and generating, by the mobile communication terminal, an event corresponding to the identified information of emotion expression.

Further, the information of emotion expression may comprise at least one of a shaking of the received images and a visible expression of a calling party.

Further, the shaking of the received images may be identified by detecting differences among pixel values of frames within a time interval in the received images.

Further, the identifying of information of emotion expression may be performed according to event request information from a calling terminal.

Further, the event may include at least one of vibration of the mobile communication terminal, a sound effect generated by the mobile communication terminal, and a screen effect generated by the mobile communication terminal.

In other words, an exemplary method for providing an emotion expression service in a mobile communication terminal comprises generating, by the mobile communication terminal, information of emotion expression for transmitting to a called terminal using a video call service, and transmitting, by the mobile communication terminal, event request information corresponding to the identified information of emotion expression.

Further, the information of emotion expression may comprise at least one of a shaking of images for transmitting to called terminal and expression of called party.

Further, the transmitting of the event request information may comprise identifying, by the mobile communication terminal, the event request information about information of emotion expression, and transmitting, by the mobile communication terminal, a video call signal including the event request information.

Further, the transmitting of the event request information may comprise identifying, by the mobile communication terminal, the event request information about information of emotion expression, and transmitting, by the mobile communication terminal, an event request signal including the event request information.

Further, the event may include at least one of vibration of the mobile communication terminal, a sound effect generated by the mobile communication terminal, and a screen effect generated by the mobile communication terminal.

As described in the above exemplary embodiments, the mobile communication terminal may generate an event corresponding to the received event request signal from the called terminal and generate an emotion expression event corresponding to detected information of emotion expression in the video call screen.

In another exemplary embodiment, the mobile communication terminal generates an emotion expression event corresponding to the received event request signal from the called terminal.

An exemplary block diagram of a mobile communication terminal for providing an emotion expression service is described below.

Figure 4:
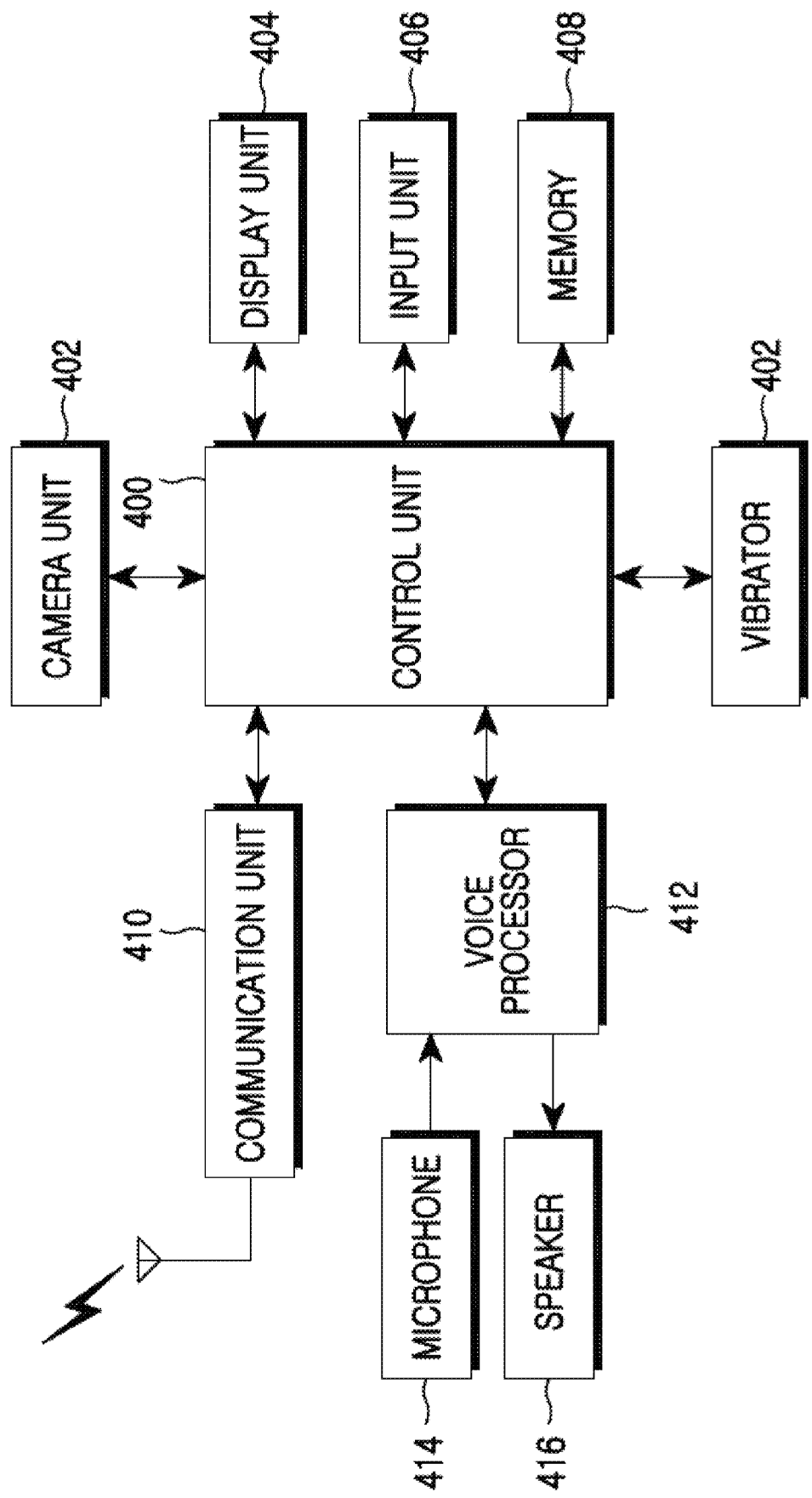

Referring to FIG. 4, the mobile communication terminal may include a control unit 400, a camera unit 402, a display unit 404, an input unit 406, a memory 408, a communication module 410, a voice processor 412, a microphone 414, a speaker 416, and a vibrator 418.

The control unit 400 performs processing and control for general operation of the mobile communication terminal. For example, the control unit 400 performs processing and control for voice telephony and data communication. According to an exemplary embodiment of the present invention, the control unit 400 controls the providing of an emotion expression service during a video call. For example, the control unit 400 controls the generating of an emotion expression event when the shaking of an image from a calling terminal is detected or the information of emotion expression is included in the image of the calling terminal as detected on the display unit 404, as illustrated in FIG. 1. As another example, the control unit 400 controls the generating of an emotion expression event corresponding to a received event request signal from a calling terminal as illustrated in FIG. 3. In this state, the control unit 400 controls the transmitting of an event request signal to the called terminal, when at least one of information of emotion expression is detected in images for transmission to the called terminal and shaking of the images for transmission to the called terminal as illustrated in FIG. 2.

The camera unit 402 photographs an image, and converts the photographed image to corresponding digital data. The camera unit 402 processes the digital data and obtains a still image, then outputs the still image to the control unit 400 or display unit 404.

The display unit 404 displays state information generated during operation of the mobile communication terminal, characters input by a user, moving images and still images. Also, the display unit 404 displays moving images and still images input from the camera unit 402.

The input unit 406 outputs functions corresponding to keys pressed by the user to the control unit 400. For example, the input unit 406 may include a keypad, a touch pad and an optical mouse.

The memory 408 stores a program for controlling a general operation of the mobile communication terminal, temporary data generated during an operation of the mobile communication terminal, a system parameter, and other storage data i.e., phone number, short message, etc.

The communication module 410 processes a Radio Frequency (RF) signal that is input/output through an antenna.

The voice processor 412 controls inputting/outputting of a voice for a voice call using the microphone 414 and a speaker 416.

The vibrator 418 operates to effect a physical vibration in the mobile communication terminal. That is, the vibrator 418, under control of the control unit 400, functions to cause the mobile communication terminal to physically shake or vibrate when a corresponding emotion expression event is detected or a corresponding event request signal is received.

The mobile communication terminal generates an emotion expression event using a vibration, a sound effect or a screen effect. If the emotion expression event is generated using a sound effect, the speaker 416 generates an emotion expression sound effect according to the control of the control unit 400. Also, if the emotion expression event is generated using the screen effect, the display unit 404 displays an emotion expression screen effect according to the control of the control unit 400. Also, if the emotion expression event is generated using the vibration, the vibrator 418 generates vibration for emotion expression according to the control of the control unit 400.

As described above, an exemplary embodiment of the present invention generates an event corresponding to included information of emotion expression in a message or a video call and generates or displays events corresponding to the emotion in the mobile communication terminal. Therefore, an exemplary embodiment of the present invention advantageously improves a user's interest in the call.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing an emotion expression service in a mobile communication terminal, the method comprising:
   performing a video call with another terminal;
   recognizing, by the mobile communication terminal, a shaking of the other terminal using images received from the other terminal; and
   generating a vibration of the mobile communication terminal corresponding to the recognized shaking of the other terminal.

2. The method of claim 1, wherein the shaking of the other terminal is recognized based on at least one of a shaking of the received images and a visible expression of a user of the other terminal.

3. The method of claim 2, wherein the shaking of the other terminal is recognized by detecting differences among pixel values of frames in the received images within a time interval.

4. The method of claim 1, wherein the recognizing of the shaking of the other terminal is performed according to event request information received from the other terminal.

5. The method of claim 1, wherein the vibration of the mobile communication terminal includes at least one of a vibration of the mobile communication terminal by a vibrator, a sound effect generated by the mobile communication terminal, and a screen effect generated by the mobile communication terminal.

6. The method of claim 1, wherein a strength of the vibration corresponds to at least one of an amount, a duration and a strength of the recognized shaking of the other terminal.

7. A method for providing an emotion expression service in a mobile communication terminal, the method comprising:
   performing a video call with another terminal
   generating, by the mobile communication terminal, information of an emotion expression; and
   transmitting, by the mobile communication terminal, event request information corresponding to the information of the emotion expression to the other terminal,
   wherein the information of the emotion expression is generated by the mobile communication terminal according to an input from a user of the mobile communication terminal.

8. The method of claim 7, wherein the information of the emotion expression comprises at least one of a shaking of images transmitting to the other terminal and an expression of the user.

9. The method of claim 7, wherein the transmitting of the event request information comprises:
   identifying, by the mobile communication terminal, the event request information corresponding to the information of the emotion expression; and
   transmitting, by the mobile communication terminal, at least one of a video call signal and an event request signal including the event request information.

10. The method of claim 7, wherein the event request information includes a request for at least one of a vibration of the mobile communication terminal, a sound effect generated by the mobile communication terminal, and a screen effect generated by the mobile communication terminal.

11. An apparatus for providing an emotion expression service in a mobile communication terminal, the apparatus comprising:
    a control unit for recognizing a shaking of another terminal using images received from the other terminal while using a video call service, and for controlling to generate a vibration corresponding to the recognized shaking of the other terminal.

12. The apparatus of claim 11, wherein the shaking of the other terminal is recognized based on at least one of a shaking of the received images and a visible expression of a user of the other terminal.

13. The apparatus of claim 12, wherein the shaking of the other terminal is recognized by detecting differences among pixel values of frames in the received images within a time interval.

14. The apparatus of claim 11, wherein the control unit recognizes the shaking of the other terminal according to event request information received from the other terminal.

15. The apparatus of claim 11, wherein the controlling, by the control unit, to generate the vibration comprises controlling to generate at least one of a vibration by a vibrator, a sound effect, and a screen effect.

16. The apparatus of claim 11, wherein a strength of the vibration corresponds to at least one of an amount, a duration and a strength of the recognized shaking of the other terminal.

17. An apparatus for providing an emotion expression service in a mobile communication terminal, the apparatus comprising:
    a camera unit for generating information of an emotion expression while using a video call service with another terminal; and
    a communication module for transmitting event request information corresponding to the information of the emotion expression to the other terminal,
    wherein the information of the emotion expression is generated by the mobile communication terminal according to an input from a user of the mobile communication terminal.

18. The apparatus of claim 17, wherein the information of the emotion expression comprises at least one of a shaking of images transmitting to the other terminal and an expression of the user.

19. The apparatus of claim 17, further comprising:
    a control unit for identifying the event request information corresponding to the information of the emotion expression,
    wherein the communication module transmits at least one of a video call signal and an event request signal including the event request information.

20. The apparatus of claim 17, wherein the communication module includes the event request information corresponding to the identified information of the emotion expression in an extra event request signal and transmits the extra event request signal.

* * * * *